US008227377B2

(12) United States Patent
Suzuki et al.

(10) Patent No.: US 8,227,377 B2
(45) Date of Patent: Jul. 24, 2012

(54) CARBON DIOXIDE ADSORBENT CAPABLE OF ADSORPTION AND DESORPTION IN DEPENDENCE ON PRESSURE OF ATMOSPHERIC PRESSURE OR HIGHER

(75) Inventors: Masaya Suzuki, Ibaraki (JP); Chieko Ikeda, Ibaraki (JP); Koji Tajiri, Aichi (JP); Keiichi Inukai, Aichi (JP); Masaki Maeda, Tokyo (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 62 days.

(21) Appl. No.: 12/595,267

(22) PCT Filed: Apr. 11, 2008

(86) PCT No.: PCT/JP2008/057197
§ 371 (c)(1),
(2), (4) Date: Oct. 26, 2009

(87) PCT Pub. No.: WO2008/129968
PCT Pub. Date: Oct. 30, 2008

(65) Prior Publication Data
US 2010/0113265 A1    May 6, 2010

(30) Foreign Application Priority Data
Apr. 13, 2007    (JP) .................................. 2007-106064

(51) Int. Cl.
*B01J 20/10*    (2006.01)

(52) U.S. Cl. ....................................................... 502/407
(58) Field of Classification Search .................. None
See application file for complete search history.

(56) References Cited

U.S. PATENT DOCUMENTS

| 4,152,404 A * | 5/1979 | Farmer ........................ 423/327.1 |
| 7,887,770 B2 | 2/2011 | Suzuki et al. |
| 2010/0320418 A1 | 12/2010 | Suzuki et al. |
| 2011/0189070 A1 | 8/2011 | Suzuki et al. |

FOREIGN PATENT DOCUMENTS

JP    2000-128520 A    5/2000
(Continued)

OTHER PUBLICATIONS

Siriwardane et al, adsorption of CO2, N2 and O2 on natural zeolites, 2003, energy and fuels, 17, pp. 571-576.*

(Continued)

*Primary Examiner* — Melvin C Mayes
*Assistant Examiner* — Stefanie Cohen
(74) *Attorney, Agent, or Firm* — Howson & Howson LLP

(57) ABSTRACT

Provided is an adsorbent adapted to adsorb carbon dioxide by increasing the pressure, and to carry out 10% or more adsorption and adsorption of the adsorbed carbon dioxide by lowering the pressure at atmospheric pressure or higher in a range of 100 to 900 kPa without vacuuming or the like. As a result of using amorphous aluminum silicate with a Si/Al ratio of 0.7 to 1.0 and having a peak in the vicinity of −78 ppm and −87 ppm in a $^{29}$Si solid NMR spectrum, adsorption and desorption of 10 wt % or more can be performed in a range of 100 to 900 kPa, and this can be used as a carbon dioxide adsorbent mainly in the pressure swing adsorption method.

12 Claims, 2 Drawing Sheets

FOREIGN PATENT DOCUMENTS

| | | |
|---|---|---|
| JP | 2001-064010 A | 3/2001 |
| JP | 2001-220129 A | 8/2001 |
| JP | 2003-019435 A | 1/2003 |
| JP | 2004-059330 A | 2/2004 |
| JP | 2004-224583 A | 8/2004 |
| JP | 2004-345892 A | 12/2004 |
| JP | 2005-040753 A | 2/2005 |

OTHER PUBLICATIONS

McCutcheon et al, si labelled nanoaluminosilicate imogolite, 2005, journal of non crystalline solids, 351, pp. 1967-1972.*

Goodman et al, structural studies of imogolite and allophanes by aluminum-27 and silicon-29 NMR spectroscopy, 1985, phys chem minerals, vol. 12, pp. 342-346.*

Farmer et al, 1991, synthetic allophane and layer silicate formation in sio2o-al2o3-feo-fe2o3-mgo-h2o systems at 23oc and 89oc in a calcareous environment, clays and clay materials, vol. 39, pp. 561-569.*

W.C. Ackerman et al., "Gas/Vapor Adsorption in Imogolite: A Microporous Tabular Aluminsilicate", Langmuir—The ACS Journal of Surfaces and Colloids, vol. 9, No. 4, pp. 1051-1057, Apr. 1993.

W.C. Ackerman et al., "Adsorption Studies of Pure and Modified Imogolite as a Potential Pore Size Standard", Characterization of Porous Solids III—Studies in Surface Science and Catalysts, vol. 87, pp. 735-744, Jul. 1994.

* cited by examiner

CARBON DIOXIDE ADSORBENT CAPABLE OF ADSORPTION AND DESORPTION IN DEPENDENCE ON PRESSURE OF ATMOSPHERIC PRESSURE OR HIGHER

TECHNICAL FIELD

The present invention generally relates to a substance, in which its application as an innovative functional material is expected, that yields superior physicochemical characteristics such as high-specific surface area, high pore volume, ion exchange performance, and adsorption performance based on a microstructure resulting from a unique shape in the field of nanotechnology, in which its practical application is strongly expected, as the important fundamental technology that will support the next-generation industry. In particular, the present invention relates to an adsorbent that is able to desorb carbon dioxide which was adsorbed under high pressure, merely by lowering the pressure without lowering to an atmospheric pressure or lower.

BACKGROUND ART

Among the technologies concerning the collection or separation of gases that are being developed pursuant to their objective and use, separation/collection technology of carbon dioxide is becoming important from the perspective including the issues of global warming.

In the methods of collecting carbon dioxide from dry gas, adsorbents of porous materials such as silica gel, alumina, zeolite, activated carbon, and diatomite, as well as silica, calcium oxide, sodium oxide, potassium oxide, iron oxide and the like are being used (refer to Patent Documents 1 and 2).

Moreover, mostly, in the pressure swing adsorption methods of carbon dioxide, zeolite 13X is being used as the adsorbent (refer to Non-patent Document 1). Zeolite 13X yields a superior adsorption amount of carbon dioxide in a range of roughly 0 to 2 atmospheres. Nevertheless, in order to desorb the adsorbed carbon dioxide for use as an effective pressure swing adsorbent, there is a problem in that vacuuming needs to be performed and the pressure needs to be 0.2 atmosphere or less.

[Patent Document 1] Japanese Patent Application No. 2003-019435
[Patent Document 2] Japanese Patent Application No. 2005-040753
[Non-patent Document 1] Latest Adsorption Technology Handbook, Published by NTS (1999), Pages 133 to 140
[Non-patent Document 2] Goodman B. A. et.al. Phys. Chem. Miner. 12, 342-346 (1985)

DISCLOSURE OF THE INVENTION

The present invention was devised in view of the foregoing circumstances, and an object thereof is to provide an adsorbent that is capable of effectively desorbing carbon dioxide which was adsorbed at a pressure of atmospheric pressure or higher by increasing the pressure, merely by lowering the pressure without vacuuming even at atmospheric pressure or higher. In particular, an object of the present invention is to provide an adsorbent for use in the pressure swing adsorption (PSA) method.

In order to achieve the foregoing object, the present inventors searched for and developed a material that could adsorb carbon dioxide by increasing the pressure, and effectively desorb the adsorbed carbon dioxide merely be lowering the pressure even at a pressure of atmospheric pressure or higher. Consequently, by reviewing materials that are superior in moisture adsorption and that make the adsorption and desorption of moisture is easy based on changes in the water vapor pressure, the present inventors discovered that amorphous aluminum silicate with a Si/Al ratio of 0.7 to 1.0 and having a peak in the vicinity of −78 ppm and −87 ppm in the $^{29}$Si solid NMR spectrum is pressure-dependent in the adsorption and desorption of carbon dioxide, and is suitable as an adsorbent in the pressure swing adsorption (PSA) method.

In other words, as a result of intense studies to achieve the foregoing object, the present inventors have completed the present invention by successfully developing an amorphous aluminum silicate being capable of adsorption and desorption of carbon dioxide upon pressure swing, having a superior adsorption/desorption performance at atmospheric pressure or higher, having a Si/Al ratio of 0.7 to 1.0, and having a peak in the vicinity of −78 ppm and −87 ppm of a $^{29}$Si solid NMR spectrum, said amorphous aluminum silicate being manufactured by mixing starting solutions so as to make the Si/Al ratio be higher than that of synthesized conventional imogolite and by binding protoimogolites with excess silicon at the periphery of the protoimogolites that are formed in a heating process of the mixed solution after desalination treatment.

In order to solve forgoing problems, the present invention provides:
(1) A carbon dioxide adsorbent capable of desorbing adsorbed carbon dioxide, wherein the carbon dioxide adsorbent is formed from amorphous aluminum silicate with a Si/Al ratio of 0.7 to 1.0 and having a peak in the vicinity of −78 ppm and −87 ppm in a $^{29}$Si solid NMR spectrum;
(2) The carbon dioxide adsorbent according to paragraph (1) above, wherein adsorption and desorption of carbon dioxide are in dependent on pressure, and the adsorbable/desorbable amount at 1 atmosphere (atmospheric pressure) to 10 atmospheres is 10 wt % or more;
(3) The carbon dioxide adsorbent according to paragraph (1) or paragraph (2) above, wherein the amorphous aluminum silicate is obtained by mixing a monosilicic aqueous solution and an aluminum solution so that the Si/Al ratio becomes 0.7 to 1.0, adjusting the pH to be 6 to 8 with acid or alkali, and thereafter heating the product.
(4) The carbon dioxide adsorbent according to any one of paragraphs (1) to (3) above, wherein the carbon dioxide adsorbent is used in the pressure swing adsorption method.
(5) The carbon dioxide adsorbent according to paragraph (4) above, wherein the carbon dioxide adsorbent is used in the pressure swing adsorption method at atmospheric pressure or higher.

According to the present invention, as a result of using amorphous aluminum silicate with a Si/Al ratio of 0.7 to 1.0 and having a peak in the vicinity of −78 ppm and −87 ppm in a $^{29}$Si solid NMR spectrum as the carbon dioxide adsorbent, it is possible to provide an adsorbent that is capable of effectively desorbing carbon dioxide, which was adsorbed by increasing the pressure, merely by lowering the pressure without vacuuming even at atmospheric pressure or higher. In particular, the present invention is able to provide an adsorbent that is suitable for use in the pressure swing adsorption (PSA) method.

BEST MODE FOR CARRYING OUT THE INVENTION

Figure 1:
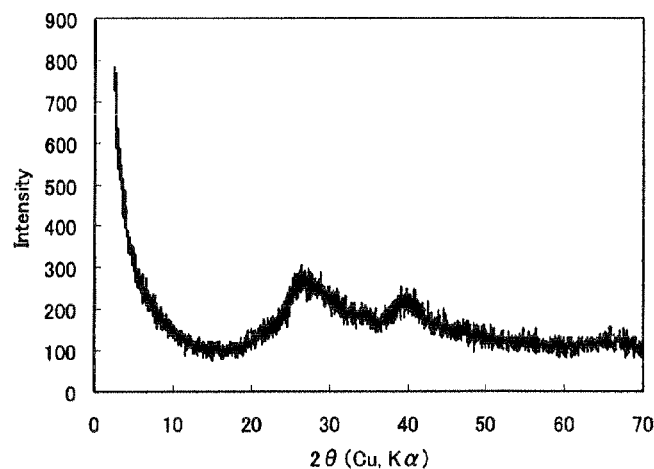
FIG. 1 is a diagram of the powder X-ray diffraction diagram of the Examples.

The present invention is now explained in further detail.

The amorphous aluminum silicate having a peak in the vicinity of −78 ppm and −87 ppm in a $^{29}$Si solid NMR spectrum according to the present invention has, as its primary constituent elements, silicon (Si), aluminum (Al), oxygen (O) and hydrogen (H), and is a hydrated aluminum silicate assembled from numerous Si—O—Al bonds. With the $^{29}$Si solid NMR spectrum of imogolite and protoimogolite, the peak can only be seen at −78 ppm (refer to Non-patent Document 2 above). Thus, the peak of −78 ppm seen in the $^{29}$Si solid NMR spectrum is a peak that is attributable to imogolite or protoimogolite, and shows that it contains a substance having a partial structure of imogolite. Meanwhile, the peak of −87 ppm in the $^{29}$Si solid NMR spectrum shows that there is a state where one or two Si—O—Si bonds are included in the SiO$_4$ tetrahedral.

The amorphous aluminum silicate having a peak in the vicinity of −78 ppm and −87 ppm in a $^{29}$Si solid NMR spectrum can be artificially obtained by mixing an inorganic silicon compound solution and an inorganic aluminum compound solution, subjecting silicon and aluminum to polymerization, performing heating and aging, and subsequently performing desalting cleansing thereto.

In the present invention, it was discovered that the amorphous aluminum silicate substance having a peak in the vicinity of −78 ppm and −87 ppm in a $^{29}$Si solid NMR spectrum is an adsorbent that is capable of adsorbing carbon dioxide by increasing the pressure, and effectively desorbing the adsorbed carbon dioxide merely by lowering the pressure without vacuuming even at atmospheric pressure or higher, and that the adsorbble/desorbable amount at 1 atmosphere to 10 atmospheres is 10 wt % or more.

In other words, as a result of intense studies, the present inventors discovered that in the process of synthesis of imogolite or protoimogolite, by mixing starting solutions so as to make the Si/Al ratio be higher than that in conventional processes, adjusting pH to be 6 to 8 with acid or alkali, and then heating the mixed solution, it is possible to obtain an amorphous aluminum silicate capable of showing a performance that is not obtained conventionally and is represented by an adsorbable/desorbable amount of 10 wt % or more at 1 to 10 atmospheres of carbon dioxide.

In the present invention, for the preparation of the tubular aluminum silicate, an inorganic silicon compound or an inorganic aluminum compound is generally used as the raw material. The reagent to be used as the silicon source will suffice as long as it is a mono-silicate, and specifically sodium orthosilicate, sodium metasilicate, amorphous colloidal silicon dioxide (Aerosil, etc.) and the like can be listed as preferable choices. In addition, the aluminum source to be bonded with the foregoing silicate molecules will suffice as long as it is an aluminum ion, and specifically aluminum compounds such as aluminum chloride, aluminum nitrate and sodium aluminate are proffered. The foregoing silicon source and aluminum source are not limited to the foregoing compounds, and other sources that yield the same effects can also be used.

These raw materials are dissolved in an appropriate aqueous solution to prepare a solution of a prescribed concentration. In order to achieve superior adsorption and desorption behavior of carbon dioxide, it is necessary to perform the mixing so that the silicon/aluminum ratio becomes 0.7 to 1.0. The concentration of the silicon compound in the solution is 1 to 1000 mmol/L and the concentration of the aluminum compound solution is 1 to 1400 mmol/L, but more preferably, it is desirable to mix 1 to 800 mmol/L of silicon compound solution and 1 to 1200 mmol/L of aluminum compound solution. Based on the foregoing ratios and concentrations, the silicon compound solution is mixed with the aluminum compound solution, and, after forming the precursor, pH is adjusted to 6 to 8, the mixed solution is subject to heating and synthesizing, and additionally subject to desalination cleansing by way of centrifugal separation, filtration, membrane separation and the like, and the solid content created thereby is the amorphous aluminum silicate substance having a peak in the vicinity of −78 ppm and −87 ppm in a $^{29}$Si solid NMR spectrum.

EXAMPLES

The present invention is now explained in detail based on the Examples and Comparative Examples. Nevertheless, the present invention is not limited by the following Examples in any way.

(Production of Amorphous Aluminum Silicate)

A sodium orthosilicate aqueous solution in the amount of 5000 ml diluted with purified water was prepared so that the Si concentration became 525 mmol/L. Aside from this, aluminum chloride was dissolved in purified water, and 5000 ml of aqueous solution having an Al concentration of 625 mmol/L was prepared. Subsequently, the sodium orthosilicate aqueous solution was mixed with the aluminum chloride aqueous solution, and stirred with a magnetic stirrer. The silicon/aluminum ratio in this case was 0.84. Moreover, 335 ml of 1N sodium hydroxide aqueous solution was dripped into the mixed solution to obtain a pH of 6.5. This solution was evenly separated in three 4 L containers, and heated in a constant temperature bath for seven days at 98° C. Thus, an aqueous solution containing amorphous aluminum silicate substance having a peak in the vicinity of −78 ppm and −87 ppm in a $^{29}$Si solid NMR spectrum was obtained. After cooling, the aqueous solution was cleaned three times with centrifugation, and thereafter dried at 60° C.

The obtained product material was subject to X-ray diffraction.

FIG. 1 shows the powder X-ray diffraction diagram of the obtained product material. As shown in FIG. 1, broad peaks can be seen in the vicinity of 2θ=27° and 40°, and characteristic peaks of an amorphous aluminum silicate were observed.

Consequently, it has been confirmed that the substance of Example 1 is an amorphous substance.

Figure 2:
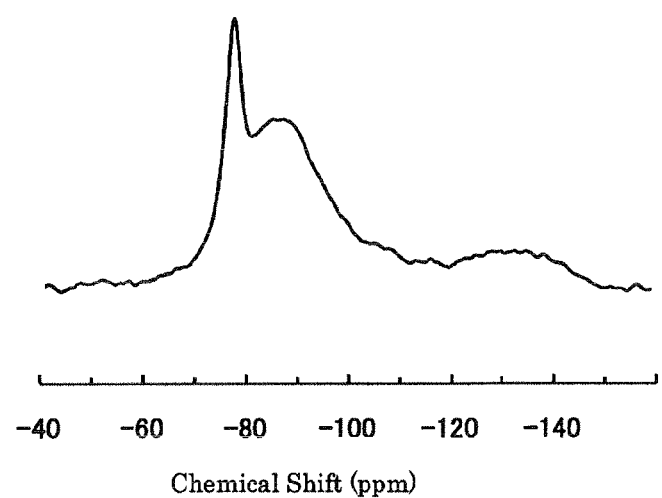
FIG. 2 is a diagram of the $^{29}$Si solid NMR spectrum of Example 1.

FIG. 2 shows the spectrum of the obtained product material based on the $^{29}$Si solid NMR measurement.

The substance obtained in Example 1 showed a peak in the vicinity of −78 ppm and −87 ppm. Consequently, it has been confirmed that this product is formed from a substance containing a configuration of OH—Si—(OAl)$_3$, which is a characteristic structure of imogolite and protoimogolite, from the peak of −78 ppm, and a substance containing a structure that polymerized the Si from the peak of −87 ppm.

(Evaluation of Carbon Dioxide Adsorption/Desorption)

The amorphous aluminum silicate having a peak in the vicinity of −78 ppm and −87 ppm in a $^{29}$Si solid NMR spectrum obtained with the Examples, while in the Comparative Examples, commercially available zeolite 13X were used. The adsorption and desorption amounts were measured using Belsorp 18 manufactured by Bell Japan, Inc. at a temperature of 25° C., pressure of 0 to 900 kPa, and equilibrium time of 300 seconds.

Moreover, as the pretreatment of the foregoing measurement, vacuuming was performed at 110° C. for 2 hours.

Figure 3:
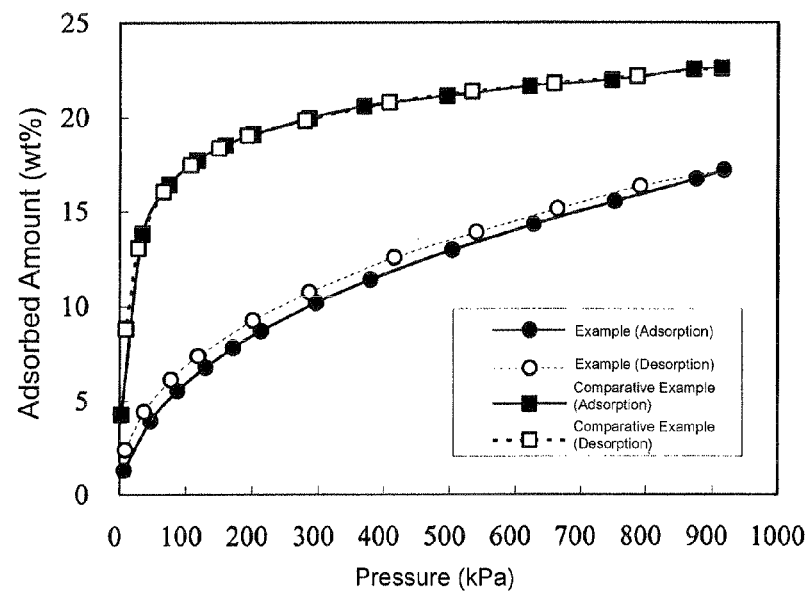
FIG. 3 is a diagram of the curve of the carbon dioxide adsorbed/desorbed amount based on the vacuum of the Examples and the Comparative Examples.

The pressure and adsorbed amount based on the vacuum obtained as the measurement results are shown in FIG. 3. And the pressure and adsorbed amount based on atmospheric pressure are shown in FIG. 4.

Figure 4:
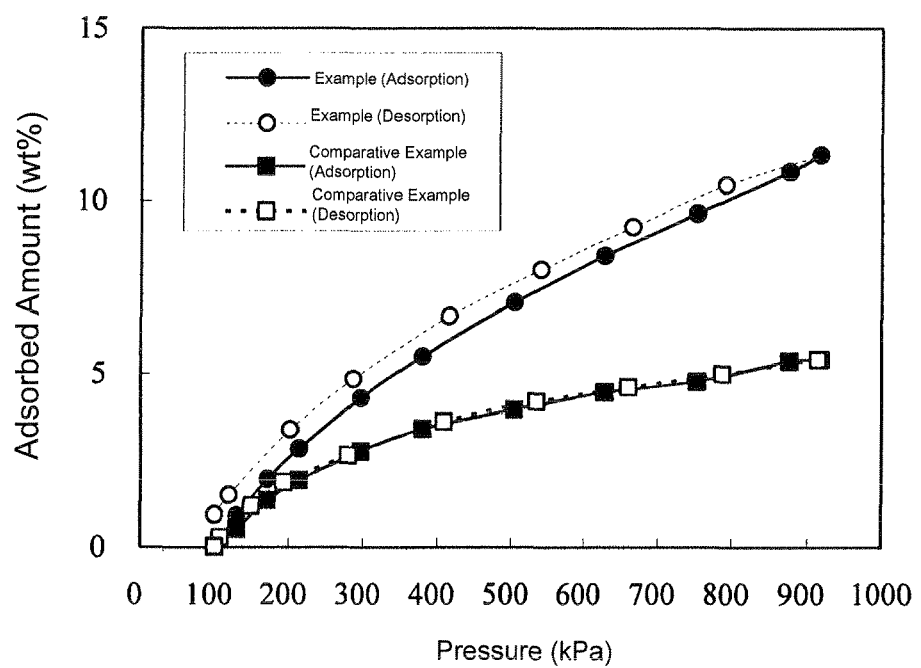
FIG. 4 is a diagram of the curve of the carbon dioxide adsorbed/desorbed amount based on the atmospheric pressure of the Examples and the Comparative Examples.

As evident from FIG. 4, the amorphous aluminum silicate having a peak in the vicinity of −78 ppm and −87 ppm in a $^{29}$Si solid NMR spectrum yielded an adsorbed amount of 11.1 wt % in a pressure range of 100 to 900 kPa during carbon dioxide adsorption, and the adsorbed amount of 100 kPa during desorption yields a value of 0.9 wt % when based on the adsorbed amount of 100 kPa during adsorption. In light of the above, it has been shown that the amorphous aluminum silicate having a peak in the vicinity of −78 ppm and −87 ppm in a $^{29}$Si solid NMR spectrum yielded an adsorbable/desorbable amount of 10 wt % or more at 100 kPa to 900 kPa.

Meanwhile, the zeolite 13X of the Comparative Examples yielded an adsorbed amount of 5.4 wt % in a pressure range of pressure 100 to 900 kPa during the carbon dioxide adsorption.

Accordingly, the amorphous aluminum silicate having a peak in the vicinity of −78 ppm and −87 ppm in a $^{29}$Si solid NMR spectrum yielded an adsorbable/desorbable amount at 100 kPa to 900 kPa, which was nearly double the amount with the use of zeolite 13X.

INDUSTRIAL APPLICABILITY

As a result of using amorphous aluminum silicate having a peak in the vicinity of −78 ppm and −87 ppm in a $^{29}$Si solid NMR spectrum, the present invention yields an adsorbed/desorbed amount of 10 wt % or more under an atmospheric pressure of 100 kPa to 900 kPa. Thus, application of the present invention to the technical field of efficiently separating carbon dioxide from gas emissions and the like by way of the pressure swing method is expected.

The invention claimed is:

1. A carbon dioxide adsorbent capable of desorbing adsorbed carbon dioxide, comprising synthetic amorphous aluminum silicate with a Si/Al ratio of 0.7 to 1.0, said amorphous aluminum silicate having a peak centered at −78ppm and another peak centered at −87ppm of a $^{29}$Si solid NMR spectrum.

2. The carbon dioxide adsorbent according to claim 1, wherein adsorption and desorption of carbon dioxide are dependent on carbon dioxide pressure, and the adsorbable/desorbable amount at 1 atmosphere (atmospheric pressure) to 10 atmospheres is 10 wt % or more.

3. The carbon dioxide adsorbent according to claim 2, wherein the amorphous aluminum silicate is obtained by mixing a monosilicic aqueous solution and an aluminum solution so as to make the Si/Al ratio be 0.7 to 1.0 in a mixed solution, adjusting the pH of the mixed solution to be 6 to 8 with acid or alkali, and thereafter heating the mixed solution of which pH was adjusted.

4. The carbon dioxide adsorbent according to any one of claims 1 to 3, wherein the carbon dioxide adsorbent is used in the pressure swing adsorption method.

5. The carbon dioxide adsorbent according to claim 4, wherein the carbon dioxide adsorbent is used in the pressure swing adsorption method at atmospheric pressure or higher.

6. The carbon dioxide adsorbent according to claim 1, wherein the amorphous aluminum silicate is obtained by mixing a monosilicic aqueous solution and an aluminum solution so as to make the Si/Al ratio be 0.7 to 1.0 in a mixed solution, adjusting the pH of the mixed solution to be 6 to 8 with acid or alkali, and thereafter heating the mixed solution of which pH was adjusted.

7. The carbon dioxide adsorbent according to claim 1, wherein the amorphous aluminum silicate has Si—O—Al bonds and Si—O—Si bonds.

8. The carbon dioxide adsorbent according to claim 1, wherein one or two of said Si—O—Si bonds are included in a $SiO_4$ tetrahedral.

9. The carbon dioxide adsorbent according to claim 1, wherein the amorphous aluminum silicate is formed from a substance containing OH—Si—(OAl)$_3$ and a substance containing a structure that polymerized Si.

10. The carbon dioxide adsorbent according to claim 1, wherein the Si/Al ratio is 0.84.

11. The carbon dioxide adsorbent according to claim 1, wherein the Si/Al ratio is 0.84 to 1.0.

12. A carbon dioxide adsorbent capable of desorbing adsorbed carbon dioxide, consisting of synthetic amorphous aluminum silicate having a Si/Al ratio of 0.7 to 1.0 and a $^{29}$Si solid NMR spectrum with peaks consisting of a peak centered at −78ppm and a peak centered at −87ppm.

\* \* \* \* \*